United States Patent
Hayakawa et al.

(10) Patent No.: US 7,870,796 B2
(45) Date of Patent: *Jan. 18, 2011

(54) LOAD SENSOR AND MANUFACTURING METHOD FOR THE SAME

(75) Inventors: Hideyuki Hayakawa, Nishio (JP); Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/383,016

(22) Filed: Mar. 19, 2009

(65) Prior Publication Data

US 2009/0235760 A1  Sep. 24, 2009

(30) Foreign Application Priority Data

Mar. 22, 2008  (JP) .............................. 2008-074765

(51) Int. Cl.
*G01L 3/00* (2006.01)
*H01R 43/00* (2006.01)

(52) U.S. Cl. .................................. 73/862.046; 29/825

(58) Field of Classification Search ............ 73/862.046; 29/825

See application file for complete search history.

(56) References Cited

U.S. PATENT DOCUMENTS

| | | | |
|---|---|---|---|
| 6,279,395 B1 * | 8/2001 | Insalaco et al. | 73/727 |
| 6,997,060 B2 * | 2/2006 | Morikawa | 73/775 |
| 7,427,720 B2 * | 9/2008 | Furukawa et al. | 177/211 |
| 7,444,889 B2 * | 11/2008 | Wehinger et al. | 73/862.637 |
| 2005/0061643 A1 * | 3/2005 | Rainey | 200/85 A |
| 2005/0103124 A1 | 5/2005 | Asai et al. | |
| 2005/0173904 A1 | 8/2005 | Morikawa | |
| 2005/0193828 A1 | 9/2005 | Morikawa | |
| 2006/0090566 A1 * | 5/2006 | Oda | 73/715 |
| 2009/0001850 A1 * | 1/2009 | Kalinin et al. | 310/313 R |
| 2009/0013801 A1 * | 1/2009 | Yamashita et al. | 73/862.045 |
| 2009/0039903 A1 * | 2/2009 | Inomata | 324/754 |
| 2009/0241690 A1 | 10/2009 | Hayakawa et al. | |

(Continued)

FOREIGN PATENT DOCUMENTS

JP  11-037860  2/1999

(Continued)

OTHER PUBLICATIONS

Office action dated Mar. 2, 2010 from the Japan Patent Office in the corresponding patent application No. 2008-074765 with English translation.

*Primary Examiner*—Lisa M Caputo
*Assistant Examiner*—Jonathan Dunlap
(74) *Attorney, Agent, or Firm*—Harness, Dickey & Pierce, PLC (57) ABSTRACT

A detection element detects at least compression load. A first member has a surface provided with the detection element. A preload adjusting member is substantially in a column shape and has a tip end configured to apply pressure to the detection element. The first member and the second member are connected with each other and configured to transmit load to the detection element. The second member has a fitted portion, which has an inner circumferential periphery being press-fitted with the preload adjusting member. The second member causes elastic deformation in response to adjustment of press-fitting of the preload adjusting member and causes change in preload applied to the detection element.

14 Claims, 3 Drawing Sheets

U.S. PATENT DOCUMENTS

2009/0243245 A1 * 10/2009 Hayakawa et al. ......... 280/93.5

FOREIGN PATENT DOCUMENTS

| JP | 2005-219689 A | 2/2004 |
| JP | 2004-360782 A | 12/2004 |
| JP | 2005-172793 | 6/2005 |
| JP | 2005-249598 | 9/2005 |
| JP | 2006-226683 | 8/2006 |

* cited by examiner

LOAD SENSOR AND MANUFACTURING METHOD FOR THE SAME

CROSS REFERENCE TO RELATED APPLICATIONS

This application is based on and incorporates herein by reference Japanese Patent Application No. 2008-74765 filed on Mar. 22, 2008.

FIELD OF THE INVENTION

The present invention relates to a load sensor. The present invention further relates to a method for manufacturing the load sensor.

BACKGROUND OF THE INVENTION

For example, US2005/0103124A1 (JP-A-2005-172793) discloses a compression-type load detection element, which includes a pressure-sensitive element and electrical insulators. The pressure-sensitive element has an electrical property, which changes in response to stress applied thereto. The pressure-sensitive element has two opposed surfaces on which the electrical insulators are integrally provided. The pressure-sensitive element of the load detection element includes a matrix, which is formed from glass, and conductive particles, which have conductivity. The conductive particles are distributed in the matrix. The conductive particles are formed from $RuO_2$, for example. The thickness of the pressure-sensitive element is 1 to 200 micrometers, for example. The pressure-sensitive element is provided with a pair of electrodes.

As disclosed in US2005/0193828A1 (JP-A-2005-249598) and JP-A-11-37860, the load detection element is capable of detecting compression load in addition to tensile load by applying preload to the load detection element in advance. US2005/0193828A1 and JP-A-11-37860 may teach an effect produced by applying the preload to the load detection element, nevertheless fails to teach a method for applying the preload in detail. The preload within a preferable range needs to be applied, and therefore the preload needs to be adjusted one by one in consideration of dimensional variation of components of the load detection element. In general, torsion strength of the load detection element is less than compression strength thereof, and therefore the load detection element is less durable against application of torque compared with application of compression load. Therefore, in the structure of US 2005/0193828A1 and JP-A-11-37860, in each of which the screw is used to adjust the preload, the load detection element may be applied with torque in response to application of the preload. In general, the rigidity in the torsion direction of the load detection element is insufficient relative to rigidity in the compression direction. Since load detection element may be broken when being applied with excessive torque, the preload caused by applying torque to the load detection element may be limited so as not to cause failure in the load detection element.

Figure 6:
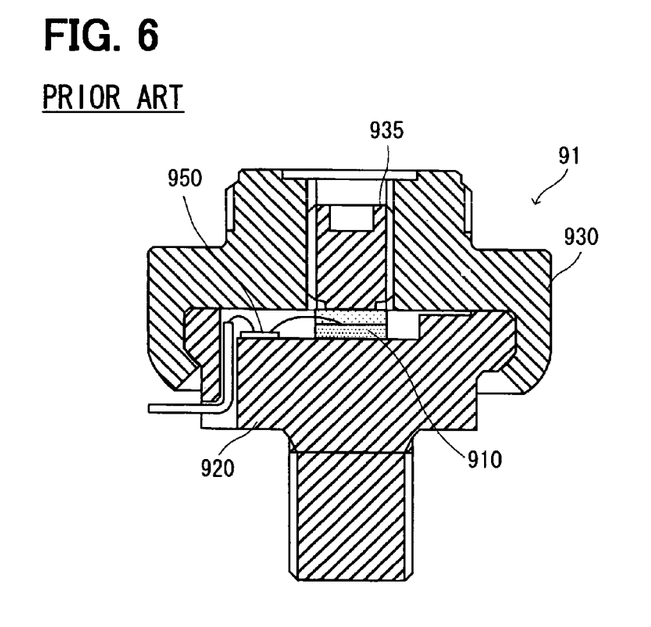
FIG. 6 is a sectional view showing a load sensor according to a prior art.

An example of a load sensor will be described with reference to FIG. 6. A load sensor 91 includes a load detection element 910, a first structural member 920, a second structural member 930, a preload adjusting member 935, a signal processing circuit 950, and the like. The preload applied to the load detection element 910 is adjusted by screwing the preload adjusting member 935 into the second structural member 930. In order to increase the preload, the preload adjusting member 935 needs to be further screwed. However, stress applied from the preload adjusting member 935 to the load detection element 910 increases in response to increase in screwing depth and application of preload. Consequently, friction between the preload adjusting member 935 and the load detection element 910 increases, and therefore the torque is apt to be further transmitted to the load detection element 910. As the preload adjusting member 935 is further screwed, the torque is further directly transmitted to the load detection element 910. When large preload is applied to the load detection element 910, excessive torque may be applied to the load detection element 910. Therefore, maximum preload is limited in consideration of the torque applied to the load detection element 910.

As described above, the preload may not be sufficiently applied in the screwing structure, in which the preload adjusting member 935 is directly onto the load detection element 910. In addition, in the screwing structure, the load applied to a detected object is in series with the load detection element when the preload adjusting member is screwed to the second structural member, and consequently the screwed portion is apt to cause elastic deformation. Therefore, the load is apt to be consumed by elastic deformation in the screwed portion, compared with the structure in which the load is directly applied to the load detection element. Thus, external tensile and compression load is less applied to the load detection element in the screwing structure. Consequently, an assignment of the load applied to the load detection element becomes small, and the sensitivity of detection of load may become insufficient.

SUMMARY OF THE INVENTION

In view of the foregoing and other problems, it is an object of the present invention to produce a load sensor in which a range of preload, a detection range of load, and detection sensitivity of the load can be also enhanced. It is another object of the present invention to produce a method for manufacturing the load sensor.

According to one aspect of the present invention, a load sensor comprises a detection element configured to detect at least compression load. The load sensor further comprises a structural member including a first member, a second member, and a preload adjusting member. The first member has a surface provided with the detection element. The first member and the second member are connected with each other and configured to transmit load to the detection element. The preload adjusting member is substantially in a column shape and has a tip end configured to apply compression load to the detection element. The second member has a fitted portion, which has an inner periphery press-fitted with the preload adjusting member. The second member is configured to elastically deform to cause change in preload applied to the detection element in response to adjustment of press-fitting of the preload adjusting member.

A method for manufacturing the load sensor, the method comprises locating the detection element between the first member and the second member. The method further comprises press-fitting the preload adjusting member into the fitted portion such that a load detection signal outputted from the detection element becomes predetermined value.

BRIEF DESCRIPTION OF THE DRAWINGS

The above and other objects, features and advantages of the present invention will become more apparent from the following detailed description made with reference to the accompanying drawings. In the drawings:

FIG. 5A is a perspective view showing a load sensor.

DETAILED DESCRIPTION OF PREFERRED EMBODIMENTS

Embodiment

Construction

Figure 1:
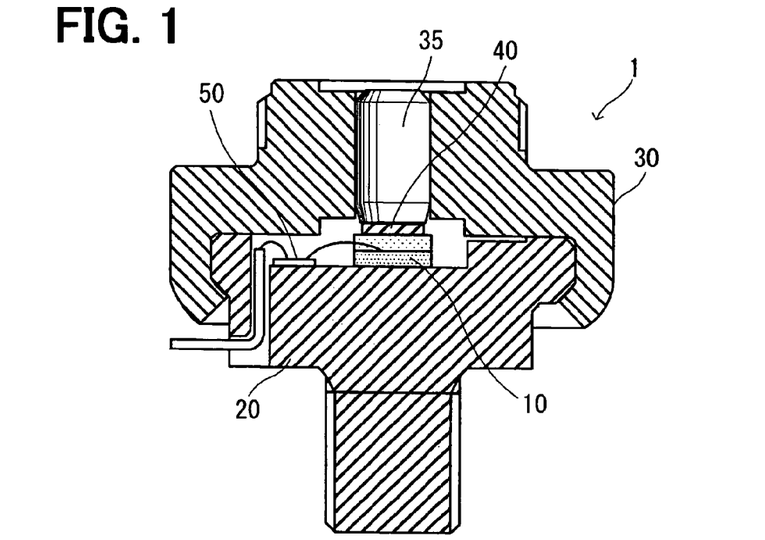
FIG. 1 is a sectional view showing a load sensor according to an embodiment.
Figure 2:
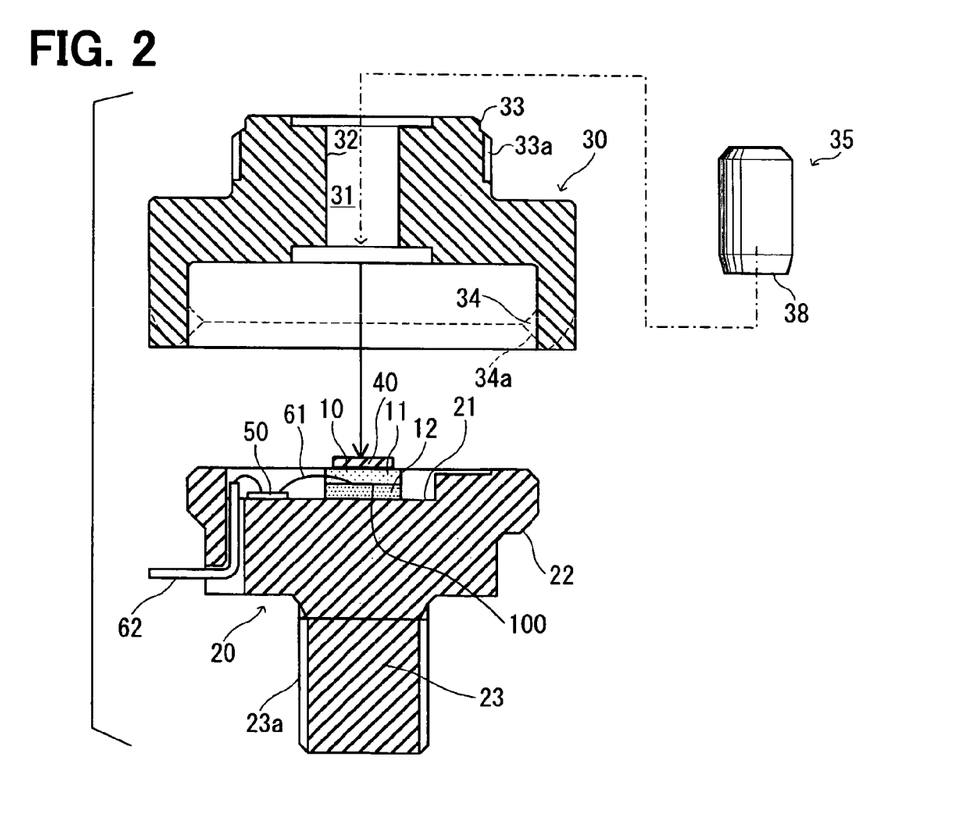
FIG. 2 is an exploded sectional view showing the load sensor according to the embodiment.

As follows, a construction and a structure of a load sensor according to the present embodiment will be described. As shown in FIGS. 1, 2, according to the present embodiment, a load sensor 1 includes a load detection element (detection element) 10, a structural member (body), a preload adjusting member 35, a signal processing circuit 50, and the like. The structural member includes a first structural member (first member) 20 and a second structural member (second member) 30.

The load detection element 10 is configured to detect at least compression force. The load detection element 10 includes element members 11, 12 and a pressure-sensitive element 100. Each of the element members (insulative members) 11, 12 is formed from an insulative material. The pressure-sensitive element 100 is substantially in a film shape and interposed between the element members 11, 12. The insulative materials of the element members 11, 12 are preferably ceramic materials such as alumina ($Al_2O_3$) having high rigidity. The element members 11, 12 may be formed from at least one of zirconia ($ZrO_2$), $MgAl_2O_4$, $SiO_2$, $3Al_2O_3.2SiO_2$, $Y_2O_3$, $CeO_2$, $La_2O_3$, $Si_3N_4$, and the like. Alternatively, the element members 11, 12 may be formed from a metallic material or the like and covered with at least one of the above insulative materials of zirconia ($ZrO_2$), $MgAl_2O_4$, $SiO_2$, $3Al_2O_3.2SiO_2$, $Y_2O_3$, $CeO_2$, $La_2O_3$, $Si_3N_4$, and the like to be electrically insulative.

It suffices that the pressure-sensitive element 100 is formed from a material, which changes in electrical property according to a load applied from the outside. For example, the pressure-sensitive element 100 may be formed from a composite material formed from glass as a matrix and electrically conductive particles, which are distributed in the matrix. The matrix of the pressure-sensitive element 100 may be formed from borosilicate glass, for example. The conductive particles of the pressure-sensitive element 100 may be formed from ruthenium oxide ($RuO_2$), lead ruthenate, or the like. The conductive particles may be preferably formed from ruthenium oxide.

The pressure-sensitive element 100 of the load detection element 10 may be formed by doctor blade, extrusion, printing such as screen printing, transfer, or the like. Specifically, the pressure-sensitive element 100 may be formed by, for example, distributing $RuO_2$ particles in glass as a matrix so as to produce a composite material, arbitrary adding a foaming agent or a reinforcing material to the composite material, and applying a suitable organic binder and solvent such that the composite material becomes in a form of paste. The composite material in a form of paste is molded and sintered to be a product of the pressure-sensitive element 100. The organic binder may be cellulose resin, acrylic resin, or the like. The solvent may be terpineol, butyl carbitol acetate, or the like.

The organic binder and the solvent are configured to form pores in the composite material of the pressure-sensitive element 100 when the composite material is heated and increased in temperature to be dried and degreased. That is, the organic binder and the solvent are configured to act as pore formation agents. The foaming agent may be an organic foaming agent such as azodicarvone amide (ADCA) and an inorganic foaming agent, for example.

The pressure-sensitive element 100 can be reduced in apparent Young's modulus by forming pores therein, and thereby strain caused in the pressure-sensitive element 100 by being applied with stress can be increased. Thus, sensitivity of the load detection element 10 can be further enhanced. As described above, the pores can be spontaneously formed when the composite material is applied with heat-treatment and calcinated to produce the pressure-sensitive element 100. A foaming agent of an organic substance or an inorganic substance may be added to the composite material of the pressure-sensitive element 100 so as to foam the composite material to form the pores therein when the composite material is sintered.

When the pressure-sensitive element 100 is produced by sintering, a glass material contained in the composite material of the pressure-sensitive element 100 is melt to form the matrix when being heated and increased in temperature. In the melting glass, each of the pores easily becomes substantially in a spherical shape. Each of the pores is preferably in a spherical shape. As each of the pores becomes to be a spherical shape, stress concentration partially caused in the pressure-sensitive element 100 can be reduced, and consequently breakage of the load detection element 10 can be avoided. The insulative material may be formed by doctor blade, extrusion, or the like. The pressure-sensitive element 100 and the insulative material may be formed by the same manufacturing process or may be formed by different manufacturing processes.

The pressure-sensitive element 100 and the insulative material are integrally formed preferably by being sintered. The pressure-sensitive element 100 and the insulative material may be adhered to each other using adhesive such as low-melting glass. The load detection element 10 may be formed from zirconia and $La_{1-x}Sr_xMnO_3$ (0<x<1), which has a pressure resistance effect, as main materials. Specifically, the load detection element 10 may be formed from particles of zirconia as a matrix and $La_{1-x}Sr_xMnO_3$ (0<x<1), which has a pressure resistance effect and distributed in the matrix. In the present structure, the load detection element 10 changes in ohmic resistance (electric resistance) according to application of load, and thereby the load can be detected according to the change in ohmic resistance. Zirconia has high heat resistance, thereby being hard to change in temperature inside the sensor formed from zirconia. Therefore, detection error caused by change in temperature inside the sensor can be reduced in the present structure. Zirconia is high in toughness, and thereby the sensor being formed from zirconia has high durability against load and pressure. Thus, the mechanical strength of the load detection element 10 is increased when being formed from zirconia, and thereby rigidity of the load sensor 1 can be also enhanced.

The first structural member 20 has one side having a recess 21 substantially at a center portion. The recess 21 is fixed with the load detection element 10. The first structural member 20 has an outer circumferential periphery defining a flange portion 22. The recess 21 accommodates a wiring 61, a signal wire 62, and the like, in addition to the load detection element 10. The wiring 61 electrically connects the signal processing circuit 50 with the load detection element 10. The signal wire 62 communicates a signal processed by the signal processing circuit 50 to an external device. The first structural member 20 is formed from carbon steel, for example. The first structural member 20 has the other side, which is the opposite side from the one side, to which the load detection element 10 is fixed. The other side of the first structural member 20 is provided with a fixing member 23 via which the first structural member 20 is fixed to a part of a detected object (not shown), load applied to which is measured. The fixing member 23 is substantially in a column-shape and extends from the one side, to which the load detection element 10 is provided, toward the opposite side. The outer circumferential periphery of the fixing member 23 defines thread grooves 23a via which the fixing member 23 can be screwed to the detected object.

The second structural member 30 includes a body portion 33, a collar portion, and a joint portion 34. The body portion 33 is substantially in a column shape and extends in the vertical direction in FIG. 1. The collar portion is located at the lower side of the body portion 33 in FIG. 1. The collar portion is substantially in a flange shape and radially extends from the lower side of the body portion 33. The joint portion 34 extends downward from the outer circumferential periphery of the collar portion. The joint portion 34 is reduced in diameter and configured to be engaged with the flange portion 22 of the first structural member 20. The joint portion 34 may be welded to the flange portion 22 of the first structural member 20. The second structural member 30 elastically deforms and thereby applies preload to the load detection element 10. The second structural member 30 and the first structural member 20 transmit load, which is applied from the outside, to the load detection element 10 and thereby the load is detected by the load detection element 10.

According to the present shapes of the first structural member 20 and the second structural member 30, rigidity of the first structural member 20 and the second structural member 30 in a compression direction, in which the load detection element 10 is compressed, is smaller than the rigidity thereof in other directions. The first and second structural members 20, 30 are joined with each other at a location, which surrounds the load detection element 10 in a perpendicular direction to the direction, in which the load detection element 10 is interposed. Transmission of tensile load and compressive load applied from the outside is divided into a transmission path through the first and second structural members 20, 30 and a transmission path through the load detection element 10. As an assignment of the load applied to the load detection element 10 becomes large, sensitivity of the load detection element 10 is enhanced. The body portion 33 has an adjusting member fitted portion 31, which is substantially in a tubular shape having a hole, which extends from a center portion of the upper surface thereof in FIG. 2 and passes therethrough substantially in the axial direction. The outer circumferential periphery of the body portion 33 defines a thread groove 33a. The thread groove 33a is configured to be screwed into the detected object (not shown).

The preload adjusting member 35 is substantially in a tubular shape or a columnar shape and has the outer diameter, which is substantially the same as or slightly larger than the inner diameter of the inner circumferential periphery 32 of the adjusting member fitted portion 31. Specifically, the outer diameter of the preload adjusting member 35 is determined to cause predetermined friction between the adjusting member fitted portion 31 and the preload adjusting member 35. Thus, the adjusting member fitted portion 31 is not pulled out even when a predetermined maximum load is applied to the load sensor 1 in an operating condition in which the preload adjusting member 35 is press-fitted to the adjusting member fitted portion 31. The end of the preload adjusting member 35 in the axial direction is substantially in a tapered shape and thereby easily press-fitted to the adjusting member fitted portion 31. The preload adjusting member 35 is press-fitted into the adjusting member fitted portion 31, and finally presses the load detection element 10 at a tip end 38. The preload adjusting member 35 is formed from quenched carbon steel, for example. The first structural member 20 and the second structural member 30 need not be separate members and may be integrally formed. A buffer member 40, which is formed from stainless steel, is interposed between the preload adjusting member 35 and the load detection element 10 so as to reduce influence caused by thermal expansion.

(Operation Effect)

Figure 3:
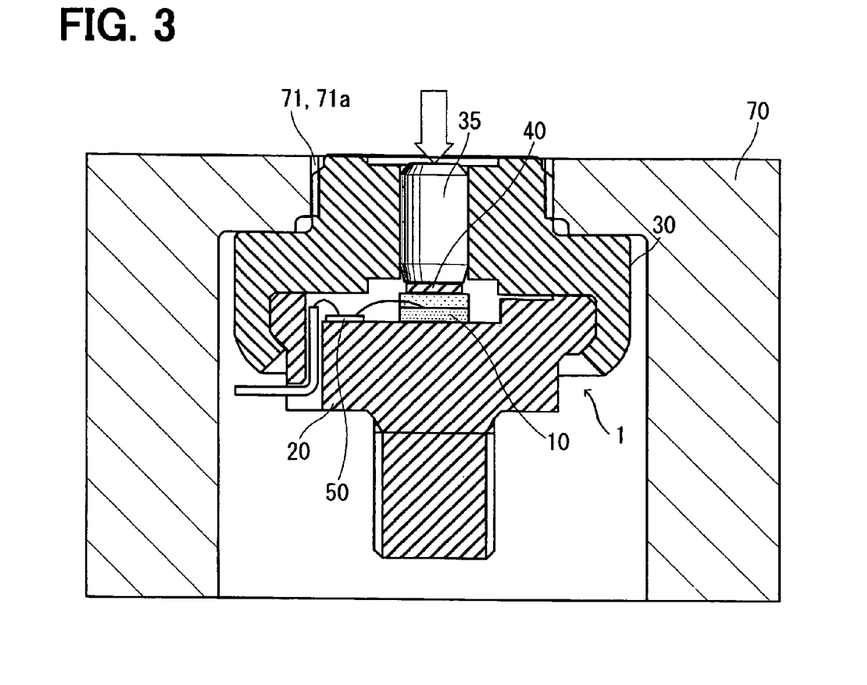
FIG. 3 is a sectional view showing the load sensor in which a preload adjusting member is being press-fitted, according to the embodiment.

According to the present embodiment, the load sensor having the above structure produces the following operation effects. The load detection element 10, the signal processing circuit 50, and the like are fixed inside the recess 21 of the first structural member 20. Subsequently, the joint portion 34 of the second structural member 30 is fitted to the flange portion 22 of the first structural member 20. Subsequently, the joint portion 34 is deformed to be a crimped portion 34a and engaged with the flange portion 22. Thus, the first structural member 20 is integrated with the second structural member 30. Thereafter, the preload adjusting member 35 is press-fitted to the adjusting member fitted portion 31. In the present press-fitting process, the following processes are carried out with monitoring of the load, which is detected by using the load detection element 10 and outputted by the detected signal processing circuit 50. The preload adjusting member 35 is press-fitted while the load detected by using the load detection element 10 is feedback controlled. Whereby, the preload applied to the load detection element 10 can be accurately controlled as desired. As shown in FIG. 3, the preload adjusting member 35 is press-fitted in a condition where the thread groove 33a on the outer circumferential periphery of the body portion 33 of the second structural member 30 is screwed to a thread groove 71a of a stationary hole 71 of a fixture 70. As follows, application of the preload will be described.

Figure 4:
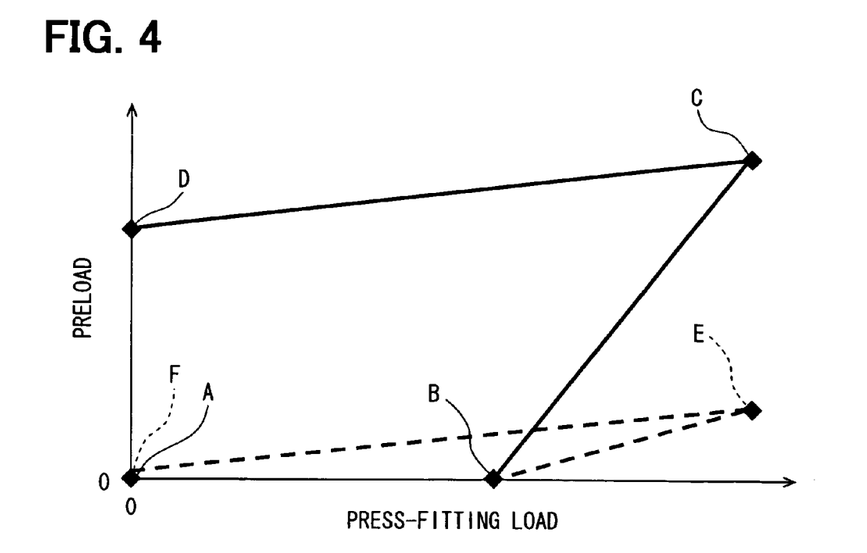
FIG. 4 is a graph showing a relationship between press-fitting load, which is applied to the preload adjusting member when the preload adjusting member is press-fitted, and preload applied to the load detection element in the load sensor according to the embodiment.

As shown in FIG. 4, at the point A, the preload adjusting member 35 can be inserted into the adjusting member fitted portion 31 without application of load in the press-fitting process of the preload adjusting member 35 from the upper portion of the adjusting member fitted portion 31. Thereafter, still at the point A, friction between the outer circumferential periphery of the preload adjusting member 35 and the inner circumferential periphery 32 of the adjusting member fitted portion 31 becomes large, and thereby the preload adjusting member 35 cannot be further inserted into the adjusting member fitted portion 31 without application of load. Preload is not applied to the load detection element 10 before the tip end 38 of the preload adjusting member 35 makes contact with the load detection element 10 at the point B. As shown in FIG. 4, the preload applied to the load detection element 10 is substantially zero and substantially constant in the range from the point A to the point B until the tip end 38 of the preload adjusting member 35, which is press-fitted into the adjusting member fitted portion 31, makes contact with the load detection element 10.

The preload applied to the load detection element 10 gradually increases in the range from the point B to the point C in response to further press-fitting of the preload adjusting member 35 after the tip end 38 of the preload adjusting member 35 makes contact with the load detection element 10. Thereafter, when the load currently applied from the outside to the preload adjusting member 35 is released, preload remains in the load detection element 10 at the point D. The preload applied to the load detection element 10 slightly decreases in the range from the point C to the point D due to spring back caused in the preload adjusting member 35 and the second structural member 30. The spring back is caused in accordance with elastic deformation caused in the second structural member 30 and the like before the preload adjusting member 35 makes contact with the load detection element 10. In consideration of the spring back, the position of the point C, which corresponds to the press-fitting of the preload adjusting member 35, is determined such that the predetermined preload is caused. Specifically, the preload adjusting member 35 is press-fitted until the load detection signal, which is outputted from the load detection element 10, becomes a summation of the spring back and the predetermined preload, and thereby the predetermined preload can be caused.

The fixture 70 shown in FIG. 3 is used in the press-fitting of the preload adjusting member 35, and thereby the preload can be steadily applied to the load detection element 10. Here, according to an assumption, the preload adjusting member 35 is press-fitted while the lower surface of the first structural member 20 in FIG. 3 is held instead of using the fixture 70, which holds a portion in the vicinity of the adjusting member fitted portion 31. In the present assumption, as indicated by the dashed line from the point B through the point E to the point F in FIG. 4, the relationship between the press-fitting load and the preload changes from the case in which the fixture 70 is used. The preload at the point F is substantially zero.

In the range from the point A to the point B, before the tip end 38 of the preload adjusting member 35 makes contact with the load detection element 10, the preload is not applied to the load detection element 10. In the present range, the relationship between the press-fitting load and the preload is substantially the same as in the case where the fixture 70 is used. After the tip end 38 makes contact with the load detection element 10, the load applied to the preload adjusting member 35 is consumed to deform the second structural member 30 and/or the first structural member 20. Therefore, the load applied to the preload adjusting member 35 hardly acts for press-fitting the preload adjusting member 35 into the adjusting member fitted portion 31. The present condition is caused since the friction between the preload adjusting member 35 and the adjusting member fitted portion 31 is set large sufficiently not to move relative to each other even when the predetermined maximum load is applied to the load sensor 1 in the operating condition. The present assumption, in which the preload adjusting member 35 is press-fitted without using the fixture 70, is substantially equivalent to an actual operation mode of the load sensor, and accordingly it is difficult to further move to press-fit the preload adjusting member 35 relatively to the adjusting member fitted portion 31.

As a result, after the tip end 38 makes contact with the load detection element 10, the preload adjusting member 35 is hardly further press-fitted into the adjusting member fitted portion 31. Accordingly, when the load is released, the elastic deformation caused in the second structural member 30 and the like before the tip end 38 makes contact with the load detection element 10 in the range from the point A to the point B is released to cause the spring back. Therefore, the tip end 38 of the preload adjusting member 35 cannot apply the preload to the load detection element 10. Furthermore, the tip end 38 of the preload adjusting member 35 may not in contact with the load detection element 10 when the load is released. Accordingly, in this case, the load sensor 1 has a dead band, in which the load applied from the outside does not act to the load detection element 10, before the tip end 38 of the preload adjusting member 35 makes contact with the load detection element 10. Even in this case, the preload adjusting member 35 may be press-fitted into the adjusting member fitted portion 31 by applying significantly large load, which exceeds the assumed maximum load, to the preload adjusting member 35. However, in this case, the significantly large load applied to the load detection element 10, the second structural member 30, and the first structural member 20 may exceed an allowable load.

On the contrary, according to the present embodiment, the fixture 70 is used to hold the portion in the vicinity of the adjusting member fitted portion 31. Therefore, the spring constant of the second structural member 30 becomes large, and thereby force exerted to the boundary between the preload adjusting member 35 and the inner circumferential periphery 32 of the adjusting member fitted portion 31 can be enhanced. Thus, the preload adjusting member 35 can be press-fitted into the adjusting member fitted portion 31 against the frictional force therebetween.

As follows, a consideration of the load applied to the load detection element 10 in an actual operation of the load sensor 1 will be made. Load applied from a detected object to the load sensor 1 is transmitted to the load detection element 10 via the adjusting member fitted portion 31 of the body portion 33, which is connected to the detected object, and the preload adjusting member 35. According to the present embodiment, the preload adjusting member 35 is press-fitted into the adjusting member fitted portion 31, dissimilarly to a conventional art, in which a preload adjusting member is screwed into an adjusting member fitted portion. Thereby, the load applied to the preload adjusting member 35 is not consumed by deformation caused in the screwed portion between screw threads of the preload adjusting member and the adjusting member fitted portion in the conventional art. Thus, the load is effectively applied to the load detection element 10, and thereby sensitivity of detection of the load can be significantly enhanced.

The first structural member 20 and the second member therebetween interpose the load detection element 10 in an interposing direction, and the first structural member 20 is urged onto the load detection element 10 in the interposing direction. In the embodiment, the rigidity of the second structural member 30, which transmits the load to the load detection element 10, in the interposing direction is smaller than the rigidity of the second structural member 30 in other directions than the interposing direction. In the present structure, influence to detection of the load sensor caused by load applied from the other direction can be reduced. Thus, the load applied in the interposed direction can be selectively and accurately detected.

In the embodiment, the components are respectively formed from the above-described materials, and thereby variation in preload caused by thermal expansion can be reduced to a minimum such as zero at a center value. The coefficients of linear expansion of alumina, carbon steel (S35C, SCM435), and stainless steel (SUS304, SUS305) are respectively about $7.2 \times 10^{-6}/^\circ$ C., $10.8–11.4 \times 10^{-6}/^\circ$ C., and $17.3 \times 10^{-6}/^\circ$ C. The summation of product of the thickness and the linear expansion coefficient of the connecting portion between the first structural member 20 and the second structural member 30 is preferably the same as the summation of product of the thickness and the linear expansion coefficient of the interposed portion mainly including the preload adjusting member 35, the buffer member 40, and the load detection element 10. That is, thermal expansion caused in the first structural member 20, the second structural member 30, the preload adjusting member 35, the buffer member 40, and the load detection element 10 located in the center of the load sensor 1 and thermal expansion caused in the connected portion between the first structural member 20 and the second structural member 30 are preferably the same. Thereby, thermal expansion caused in the connection member and the load detection element 10 can be negated, and thereby influence such as variation in load caused by thermal expansion can be reduced to a minimum.

(Modification)

The first structural member and the second structural member need not be separate members and may be integrally formed. Specifically, according to the present modification shown in FIGS. 5A, 5B, a load sensor 400 has a body portion 401 therein defining an opening (inner space) 405 in which the load detection element 10 is provided. The opening 405 is an elongated hole extending perpendicularly to the vertical direction in FIG. 5B in which the preload is applied to the load detection element 10. The opening 405 extends in the direction perpendicular to the sheet surface of FIG. 5B. The opening 405 has the width in the lateral direction perpendicular to the vertical direction in which the preload is applied, and the width is larger than the height of the opening 405 in the vertical direction. According to the present modification, the rigidity of the body portion 401 in the vertical direction, in which the preload is applied to the body portion 401, is lower than the rigidity of the body portion 401 in other directions. The body portion 401 is integrally formed with mounting portions 402, 403. The mounting portions 402, 403 are respectively in a substantially columnar shape and a substantially tubular shape and extend from the body portion 401 in the opposite axial directions. The mounting portions 402, 403 extend in the vertical direction in which a preload adjusting member 410 applies the preload to the load detection element 10. The outer circumferential peripheries of the mounting portions 402, 403 respectively define thread grooves 402a, 403a via which the load sensor 400 is mounted to a detected object (not shown).

Figure 5A:
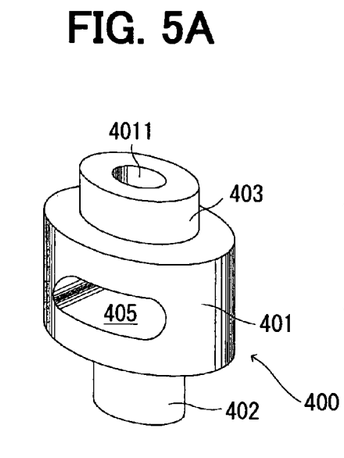
Figure 5B:
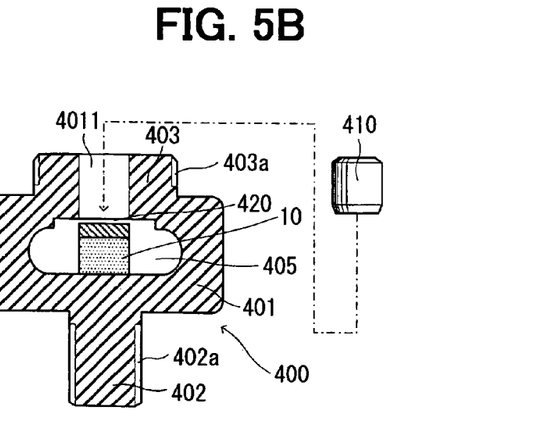
FIG. 5B is a sectional view showing the load sensor, according to a modification of the embodiment.

The mounting portion 403 and the body portion 401 have an adjusting member fitted portion 4011, which is a through hole extending from the end surface of the mounting portion 403 at the opposite side of the body portion 401 to the opening 405. The preload adjusting member 410 is press-fitted into the mounting portion 403, and thereby the load detection element 10 is urged and applied with the preload. A buffer member 420 is interposed between the preload adjusting member 410 and the load detection element 10.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The above structures of the embodiments can be combined as appropriate. Various modifications and alternations may be diversely made to the above embodiments without departing from the spirit of the present invention.

What is claimed is:

1. A load sensor comprising:
   a detection element configured to detect at least compression load;
   a structural member including a first member, a second member, and a preload adjusting member; and
   a buffer member in contact with a contact portion of the detection element, wherein
   the contact portion is formed from ceramic;
   the buffer member is formed from stainless steel;
   the second member is formed from carbon steel;
   the first member has a surface provided with the detection element,
   the first member and the second member are connected with each other and configured to transmit load to the detection element,
   the preload adjusting member is substantially in a column shape having a non-threaded outer surface and has a tip end configured to apply compression load to the detection element,
   the second member has a fitted portion, which has a non-threaded inner surface press-fitted with the non-threaded outer surface of the preload adjusting member,
   the second member is configured to elastically deform to cause a change in preload applied to the detection element in response to adjustment of press-fitting of the preload adjusting member; and
   the entire non-threaded outer surface of the preload adjusting member being in direct surface contact with the non-threaded inner surface of the fitted portion of the second member to cause friction there between and apply preload to the detection element.

2. The load sensor according to claim 1,
   wherein the first member and the second member therebetween interpose the detection element in an interposing direction, and
   rigidity of the structural member in the interposing direction is smaller than rigidity of the structural member in other directions.

3. The load sensor according to claim 1,
   wherein the detection element has a matrix, which is formed from glass, and conductive particles, which are distributed in the matrix and formed from $RuO_2$ having electrical conductivity,
   the detection element includes a pressure-sensitive element, which changes in electrical property in response to application of stress, and insulative members, which are electrically insulative, and
   the insulative members are integrally formed respectively on opposed surfaces of the pressure-sensitive element.

4. The load sensor according to claim 1,
   wherein the structural member therein defines an inner space, which has a first length in an axial direction of the structural member,
   the inner space has a second length in a direction perpendicular to the axial direction, and
   the first length is smaller than the second length.

5. The load sensor according to claim 1, wherein the first member is integrally formed with the second member.

6. A method for manufacturing the load sensor according to any one of claims 1-2 and 3-5, the method comprising:
   locating the detection element between the first member and the second member; and
   press-fitting the preload adjusting member into the fitted portion such that a load detection signal outputted from the detection element becomes a predetermined value.

7. The method according to claim 6, wherein the preload adjusting member is press-fitted while a portion of the second member in the vicinity of the fitted portion is held.

8. The method according to claim 6, further comprising:
securing a portion of the second member in the vicinity of the fitted portion to a fixture, in advance of the press-fitting.

9. The method according to claim 6,
wherein the press-fitting further includes:
monitoring the load detection signal outputted from the detection element.

10. The load sensor according to claim 1, wherein the preload adjusting member has an outer diameter larger than an inner diameter of the fitted portion.

11. The load sensor according to claim 10, wherein a tip end of the preload adjusting member is substantially in a tapered shape configured to be fitted to the fitted portion.

12. The load sensor according to claim 10, wherein the non-threaded outer surface of the preload adjusting member is a cylindrical surface configured to be entirely in surface contact with the non-threaded inner surface of the fitted portion of the second member.

13. The load sensor according to claim 12, wherein the preload adjusting member is press-fitted to the fitted portion by applying a press-fitting load in an axial direction of the preload adjusting member.

14. A load sensor comprising:
a detection element configured to detect at least compression load;
a structural member including a first member, a second member, and a preload adjusting member; and
a buffer member, which is in contact with a contact portion of the detection element,
wherein the first member has a surface provided with the detection element,
the first member and the second member are connected with each other and configured to transmit load to the detection element,
the preload adjusting member is substantially in a column shape and has a tip end configured to apply compression load to the detection element,
the second member has a fitted portion, which has an inner periphery press-fitted with the preload adjusting member,
the second member is configured to elastically deform to cause change in preload applied to the detection element in response to adjustment of press-fitting of the preload adjusting member,
the contact portion is formed from ceramic,
the buffer member is formed from stainless steel, and
the second member is formed from carbon steel.

* * * * *